United States Patent
Lakshminarasimha et al.

(10) Patent No.: US 11,983,277 B2
(45) Date of Patent: May 14, 2024

(54) IDENTIFYING A SECURITY VULNERABILITY IN A COMPUTER SYSTEM

(71) Applicant: Hewlett Packard Enterprise Development LP, Houston, TX (US)

(72) Inventors: Umesh Markandaya Lakshminarasimha, Karnataka (IN); Mahesh Ramenahalli Mayanna, Karnataka (IN); Naveena Kedlaya, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 221 days.

(21) Appl. No.: 16/513,454

(22) Filed: Jul. 16, 2019

(65) Prior Publication Data
US 2021/0019421 A1   Jan. 21, 2021

(51) Int. Cl.
G06F 21/57   (2013.01)
(52) U.S. Cl.
CPC ...... *G06F 21/577* (2013.01); *G06F 2221/034* (2013.01)
(58) Field of Classification Search
CPC .......... G06F 21/577; G06F 2221/034
See application file for complete search history.

(56) References Cited

U.S. PATENT DOCUMENTS

| | | | |
|---|---|---|---|
| 6,792,393 B1 * | 9/2004 | Farel | G06F 11/079 702/176 |
| 7,673,023 B1 * | 3/2010 | Nelson | G06F 8/65 709/224 |
| 8,881,272 B2 | 11/2014 | Bunker et al. | |
| 8,943,599 B2 | 1/2015 | Guarnieri et al. | |
| 9,189,362 B2 | 11/2015 | Bellomie | |
| 10,489,142 B1 * | 11/2019 | Podgorsky | G06F 8/65 |
| 2006/0218267 A1 | 9/2006 | Khan et al. | |
| 2008/0313312 A1 | 12/2008 | Flynn et al. | |
| 2009/0144332 A1 * | 6/2009 | Montgomery | G06F 21/565 |
| 2009/0222677 A1 * | 9/2009 | Astigarraga | G06F 11/2035 709/224 |

(Continued)

OTHER PUBLICATIONS

Yu, Zhilou, and H. Ji. "Notice of Retraction Research of IPMI Management Based on BMC SOC." International Conference on Management and Service Science IEEE, 2010: p. 2-4 (Year: 2010).*

(Continued)

*Primary Examiner* — Wasika Nipa
*Assistant Examiner* — Zhe Liu
(74) *Attorney, Agent, or Firm* — Trop, Pruner & Hu, P.C.

(57) ABSTRACT

Some examples relate to identifying a security vulnerability in a computer system. In an example, via a NAND flash memory, a computer system may be scanned to obtain information related to a software program, based on a rule set defined in a management controller (e.g., baseboard management controller (BMC)) on the computer system. The NAND flash memory may obtain metrics related to the software program via the BMC. The NAND flash memory may analyze the information related to the software program along with the metrics related to the software program to identify a security vulnerability in the computer system. The NAND flash memory may provide the information related to the security vulnerability in the computer system to the BMC.

17 Claims, 5 Drawing Sheets

(56) References Cited

U.S. PATENT DOCUMENTS

| | | | | |
|---|---|---|---|---|
| 2013/0179624 | A1 | 7/2013 | Lambert et al. | |
| 2014/0331326 | A1* | 11/2014 | Thakur | H04L 63/1433 726/25 |
| 2016/0217283 | A1* | 7/2016 | Liu | G06F 21/566 |
| 2016/0378691 | A1* | 12/2016 | Sherman | G06F 3/06 711/163 |
| 2017/0053116 | A1* | 2/2017 | Treweek | H04L 9/3247 |
| 2018/0063166 | A1* | 3/2018 | Warden | H04L 63/061 |
| 2018/0246763 | A1* | 8/2018 | Eno | G06Q 50/10 |
| 2018/0267836 | A1* | 9/2018 | Olarig | G06F 9/5027 |
| 2018/0322285 | A1* | 11/2018 | Olarig | G06F 21/564 |
| 2019/0004929 | A1* | 1/2019 | Fastabend | G06F 12/0875 |
| 2019/0034635 | A1* | 1/2019 | Khatri | G06F 21/552 |
| 2019/0050234 | A1* | 2/2019 | Segal | G06F 11/3466 |
| 2019/0146851 | A1* | 5/2019 | Hu | G06F 9/5077 718/104 |
| 2019/0156039 | A1* | 5/2019 | Harsany | G06F 21/568 |
| 2019/0187909 | A1* | 6/2019 | Pinto | G06F 3/0683 |
| 2020/0074086 | A1* | 3/2020 | Bulygin | G06F 21/572 |
| 2020/0137084 | A1* | 4/2020 | Roy | H04L 63/0236 |
| 2020/0351293 | A1* | 11/2020 | Ponnuru | H04L 63/1433 |

OTHER PUBLICATIONS

Kant. "Data center evolution: A tutorial on state of the art, issues, and challenges." Computer Networks 53.17 (2009): p. 2939-2965 (Year: 2009).*

Dickinson, John. "Operating systems projects built on a simple hardware simulator." Proceedings of the thirty-first SIGCSE technical symposium on Computer science education. 2000. p. 320-324. (Year: 2000).*

Moore et al., "Gartner Forecasts Worldwide Information Security Spending to Exceed $124 Billion in 2019", available online at <https://www.gartner.com/en/newsroom/press-releases/2018-08-15-gartner-forecasts-worldwide-information-security-spending-to-exceed-124-billion-in-2019>, Aug. 15, 2018, 3 pages.

Périgaud et al., "Subverting your server through its BMC: the HPE iLO4 case", 2018, 28 pages.

Susan Moore, "Focus on the Biggest Security Threats, Not the Most Publicized", available online at <https://www.gartner.com/smarterwithgartner/focus-on-the-biggest-security-threats-not-the-most-publicized/>, Gartner, Nov. 2, 2017,, 9 pages.

* cited by examiner

| Operating system | Software / Application | VS | Patches | VS | Ports | VS | Protocols | VS | Services | VS |
|---|---|---|---|---|---|---|---|---|---|---|
| Windows 2016 | SQL Server 2012 Service Pack 2 | ON | KB3045321 KB3194719 | ON | | | | | | |
| | Microsoft Visual Studio 2010 | | KB2645410 KB2635973 KB2549864 | | | | | | | |
| Windows 2012 | | | KB2898868 KB2901125 KB2931358 KB2931366 | ON | 69 | On | TFTP | On | | |
| RHEL 7.x | NFS | Off | | | | | | | | |
| SLES 13.x | | | | | | | | | | |

(12) United States Patent

IDENTIFYING A SECURITY VULNERABILITY IN A COMPUTER SYSTEM

BACKGROUND

Enterprises may use a wide array of computing devices, for example, servers, for their operational needs. The devices may use different operating systems and run a variety of computer applications, which may provide various services to customers. Ensuring efficient and secure running of the computing devices may be considered a reasonable expectation from a business's point of view.

BRIEF DESCRIPTION OF THE DRAWINGS

The following detailed description references the drawings, wherein:

FIG. 2 is a block diagram of an rule set for identifying a security vulnerability;

DETAILED DESCRIPTION

Depending on their requirement, enterprises may deploy a variety of computing devices, including servers. The number of these devices may range from a handful to thousands. Secure running of computing devices may be considered a basic expectation from an organization's perspective considering their business credibility may rely on it. However, in the present day digital world, addressing vulnerability of a device is a major challenge. Individuals, for example, hackers may try to take advantage of a security vulnerability in a computing system to create havoc with a business process or data (e.g., customer data) of an enterprise, which may not only impact its credibility but may also, in some scenarios, put it out of business. Seemingly, security vulnerabilities of a computing device, and their exploitation are the root cause of most information security breaches.

As used herein, the term "security vulnerability" may refer to include a weakness in a computer system which may be exploited to perform an unauthorized action within the computer system.

To address these technical challenges, the present disclosure describes various examples for identifying a security vulnerability in a computer system. In an example, via a NAND flash memory, a computer system may be scanned to obtain information related to a software program, based on a rule set defined in a management controller (e.g., baseboard management controller (BMC)) on the computer system. The NAND flash memory may also obtain metrics related to the software program via the BMC. The NAND flash memory may then analyze the information related to the software program along with the metrics related to the software program to identify a security vulnerability in the computer system. The NAND flash memory may then provide the information related to the security vulnerability in the computer system to the BMC.

Figure 1:
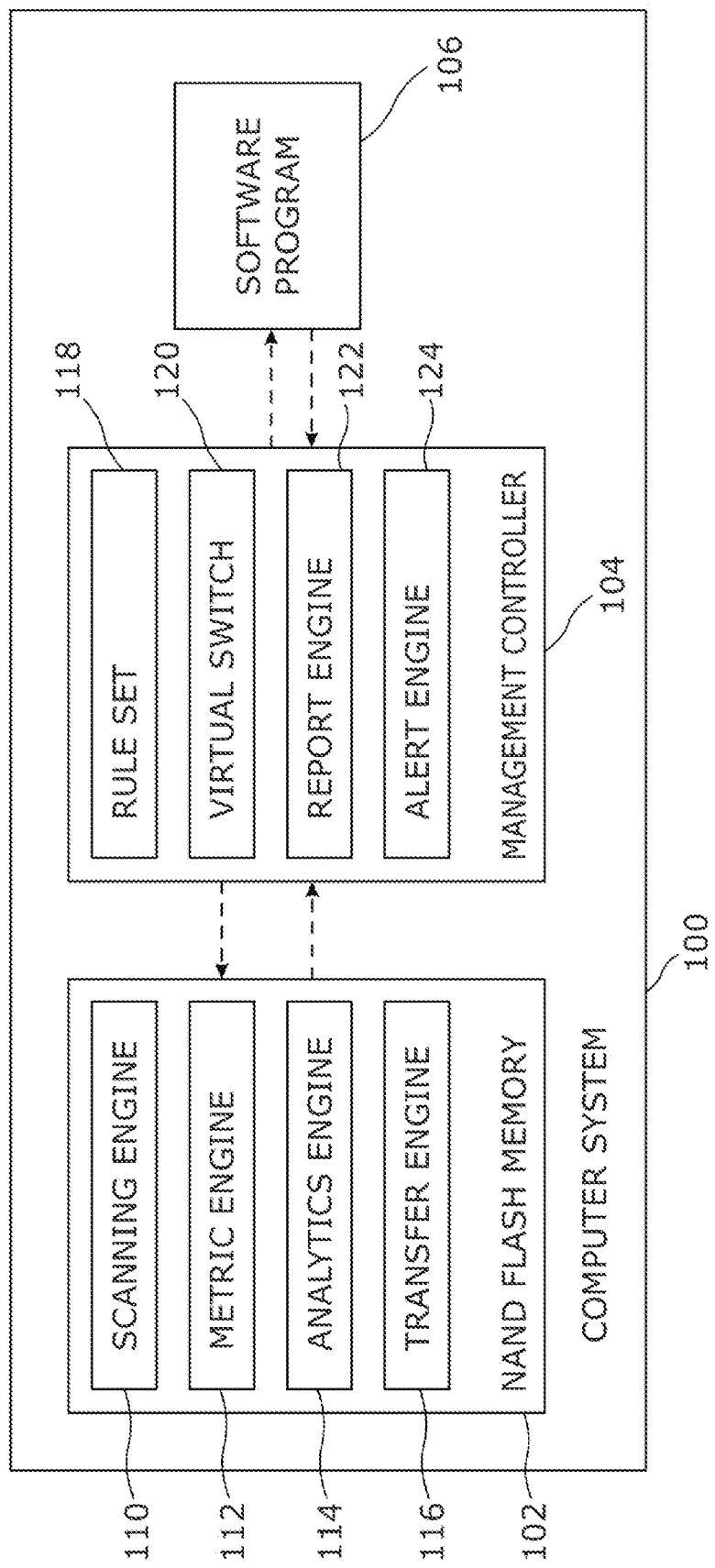
FIG. 1 is a block diagram of an example computer system for identifying a security vulnerability.

FIG. 1 is a block diagram of an example computer system 100 for identifying a security vulnerability.

In an example, computer system 100 may represent any type of computing device capable of reading machine-executable instructions. Examples of the computing device may include, without limitation, a server, a desktop computer, a notebook computer, a tablet computer, a thin client, a mobile device, a personal digital assistant (PDA), and the like. In an example, computer system 100 may be a part of a datacenter.

As used herein, the term "server" may include a computer (e.g., hardware) and/or a computer program (machine-readable instructions) that may process requests from other (client) computers over a network.

In an example, computer system 100 may include a NAND flash memory 102, and a management controller 104.

NAND flash memory 102 may include an electronic (solid-state) non-volatile computer storage medium that can be electrically erased and reprogrammed. NAND flash memory 102 is named after the NAND logic gate. The individual flash memory cells exhibit internal characteristics similar to those of the corresponding gates. NAND flash memory 102 may be written and read in blocks (or pages) which are generally much smaller than the entire device. In addition to being non-volatile, flash memory offers fast read access times. In an example, NAND flash memory 102 may be an embedded NAND flash memory device.

Management controller 104 may represent an autonomous computer subsystem that provides, for example, management and monitoring capabilities independently of computer system's 100 CPU, firmware and operating system. Management controller 104 may be used for out-of-band management of computer system 100 and monitoring of its operation. In an example, a management controller may present a dedicated communication channel between NAND flash memory 102 and a software program (e.g., operating system and/or computer application) on computer system 100. In an example, an interface between management controller 104 and NAND flash memory 102 may be utilized for the purpose of enabling out-of-band remote manageability of computer system 100 by a remote management device.

In an example, management controller 104 may provide a mechanism to manage computer system 100 by using a network connection to the hardware rather than to an operating system or login shell. In an example, management controller 104 may include a baseboard management controller (BMC). Management controller 104 may manage the interface between system software (e.g., operating system and platform hardware in computer system 100.

In an example, NAND flash memory 102 may include a scanning engine 110, a metric engine 112, an analytics engine 114, and a transfer engine 116.

In an example, management controller 104 may include a rule set 118, a virtual switch (VS) 120, a report engine 122, and an alert engine 124.

Engines 110, 112, 114, 116, 122, and 124 may include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of NAND flash memory 102 and/or management controller 104. In some examples, the at least one machine-readable storage medium may store instructions that, when executed by the at least one processing resource, at least partially implement some or all engines of NAND flash memory 102 and/or management controller 104. In such examples, NAND flash memory 102 and/or management controller 104 may include the at least one machine-readable storage medium storing the instructions and the at least one processing resource to execute the instructions.

In an example, scanning engine 110 in NAND flash memory 102 may scan computer system 100 to obtain information related to a software program (machine-readable instructions) 106, based on a rule set defined in management controller 104. Software program 106 may include system software (e.g., an operating system) and/or application software (e.g., a computer application). In an example, to obtain information related to a software program 106, scanning engine 110 may log into the software program (e.g., operating system) 106 of the computer system 100 via management controller 104 that provides a dedicated communication channel between NAND flash memory 102 and the software program. By scanning the software program 106 of the computer system 100 in this manner, scanning engine 110 may be able to obtain information related to the software program 106. In an example, the scanning by scanning engine 110 may be performed automatically by the computer system 100, for example, at a pre-defined time. In another example, the scanning may be initiated by a user.

In an example, management controller 104 may include a rule set that includes parameters to be determined for a software program (e.g., 106). FIG. 2 illustrates an example rule set 200. In the example of FIG. 2, rule set 200 may include the following example parameters that may be determined for a software program (e.g., 106): a version of the software program (e.g., Windows®, RHEL®, Linux®, etc.), information related to a patch (or patches) applied to the software program, a port(s) related to the software program, a protocol(s) related to the software program, and a service(s) related to the software program. In an example, scanning engine 110 may scan computer system 100 to obtain information related to a software program 106, based on the parameters defined in the rule set. For example, for a computer system 100 based on Windows operating system, scanning engine 110 may scan computer system 100 to obtain information 202 related to a version of the operating system (e.g., Windows 2012), information related to a patch (or patches) applied to the operating system (e.g., KB2898868, KB2901125, KB2931358, and KB2931366), a port(s) related to the operating system (e.g., port 69), and a protocol(s) related to the operating system (e.g., Trivial File Transfer Protocol (TFTP)).

To provide another example, for a computer system running an SQL Server, scanning engine 110 may scan computer system 100 to obtain information 201 related to: a version of the computer application (e.g., SQL Server 2012 Service Pack 2), and information related to a patch (or patches) applied to the computer application (e.g., KB3045321 and KB319471). By scanning computer system 100, scanning engine 110 may be able to obtain information related to a software program 106 that may include, for example, a missing patch, an unauthorized service, an open port, and an unsecured protocol. In an example, management controller 104 may include a virtual switch (VS) to enable component-level scanning in computer system 100. For example, a specific virtual switch may be used to enable/disable scanning of a particular port in computer system 100 by scanning engine 110. If the virtual switch is enabled, scanning engine 110 may perform a scan related to the port. If the virtual switch is disabled, scanning engine 110 may not perform the scan. Likewise, component-specific (for example, for a port, a protocol, a service, etc.) virtual switch may be used in management controller 104 for scanning engine 110 to perform a component-specific scan in computer system 100.

Metric engine 112 may obtain metrics related to software program 106 via the BMC 104. In an example, to obtain metrics related to software program 106, metric engine 104 may use the dedicated communication channel provided by the management controller 104 between NAND flash memory 102 and the software program 106. Some non-limiting examples of the metrics related to software program 106 may include CPU usage, memory usage, storage usage, and I/O usage related to software program.

Analytics engine 114 may analyze the information related to software program 106 along with the metrics related to software program 106 to identify a security vulnerability in the computer system 100. To provide an example, analytics engine 114 may analyze information related to an operating system. For example, these may include: a version of the operating system (e.g., Windows 2012), information related to a patch (or patches) applied to the operating system (e.g., KB2898868, KB2901125, KB2931358, and KB2931366), a port(s) related to the operating system (e.g., port 69), and a protocol(s) related to the operating system (e.g., Trivial File Transfer Protocol (TFTP)). Analytics engine 114 may correlate this information with metrics related to software program 106, for example, CPU usage, memory usage, storage usage, I/O usage, etc. to identify a security vulnerability, for example related to the software program, in the computer system 100. Examples of the software vulnerability may include, for example, a missing patch, an unauthorized service, an open port, and an unsecured protocol.

Transfer engine 116 may provide the information related to the security vulnerability in the computer system 100 to management controller 104. In an example, the information related to the security vulnerability in the computer system 100 may be provided to report engine 122 in management controller 104. In an example, the information related to the security vulnerability may be obtained, for example by a user, from BMC. In an example, report engine 122 may generate a report related to the security vulnerability in computer system 100 by the BMC. In an example, the report related to the security vulnerability in the computer system 100 may be obtained from the BMC.

In an example, in response to the information related to the security vulnerability in the computer system 100 being provided to report engine in management controller 104, alert engine 124 may generate an alert related to the security vulnerability in the computer system 100. In an example, the alert related to the security vulnerability in the computer system 100 may be provided to a user.

Figure 3:
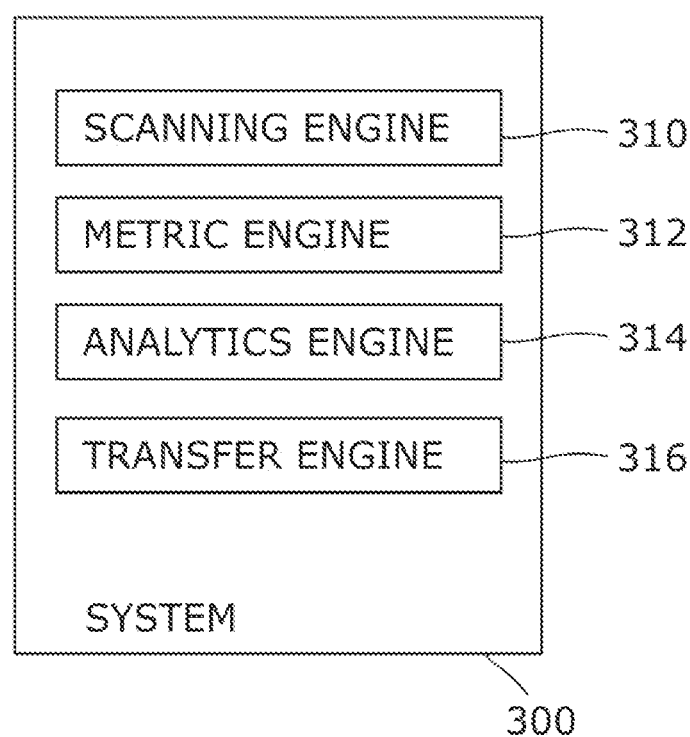
FIG. 3 is a block diagram of an example device for identifying a security vulnerability in a computer system.

FIG. 3 is a block diagram of an example system 300 for identifying a security vulnerability. In an example, system 300 may be analogous to computer system 100 of FIG. 1, in which like reference numerals correspond to the same or similar, though perhaps not identical, components. For the sake of brevity, components or reference numerals of FIG. 3 having a same or similarly described function in FIG. 1 are not being described in detail in connection with FIG. 3. Said components or reference numerals may be considered alike.

In an example, system 300 may represent any type of computing device capable of reading machine-executable instructions. Examples of the computing device may include, without limitation, a server, a desktop computer, a notebook computer, a tablet computer, a thin client, a mobile device, a personal digital assistant (PDA), and the like.

In an example, a NAND flash memory in system 300 may include a scanning engine 310, a metric engine 312, an analytics engine 314, and a transfer engine 316. In an example, scanning engine 310, metric engine 312, analytics engine 314, and transfer engine 316 may perform functionalities similar to those described earlier in reference to scanning engine 110, metric engine 112, analytics engine 314, and transfer engine 316 of FIG. 1, respectively.

In an example, scanning engine 310 in the NAND flash memory may obtain information related to a software program, based on a rule set defined in a baseboard management controller (BMC) on the system. Metric engine 312 in the NAND flash memory may obtain metrics related to the software program via the BMC. Analytics engine 314 in the NAND flash memory may analyze the information related to the software program along with the metrics related to the software program to identify a security vulnerability in the system. Transfer engine 316 in the NAND flash memory may provide information related to the security vulnerability in the system to the BMC.

Figure 4:
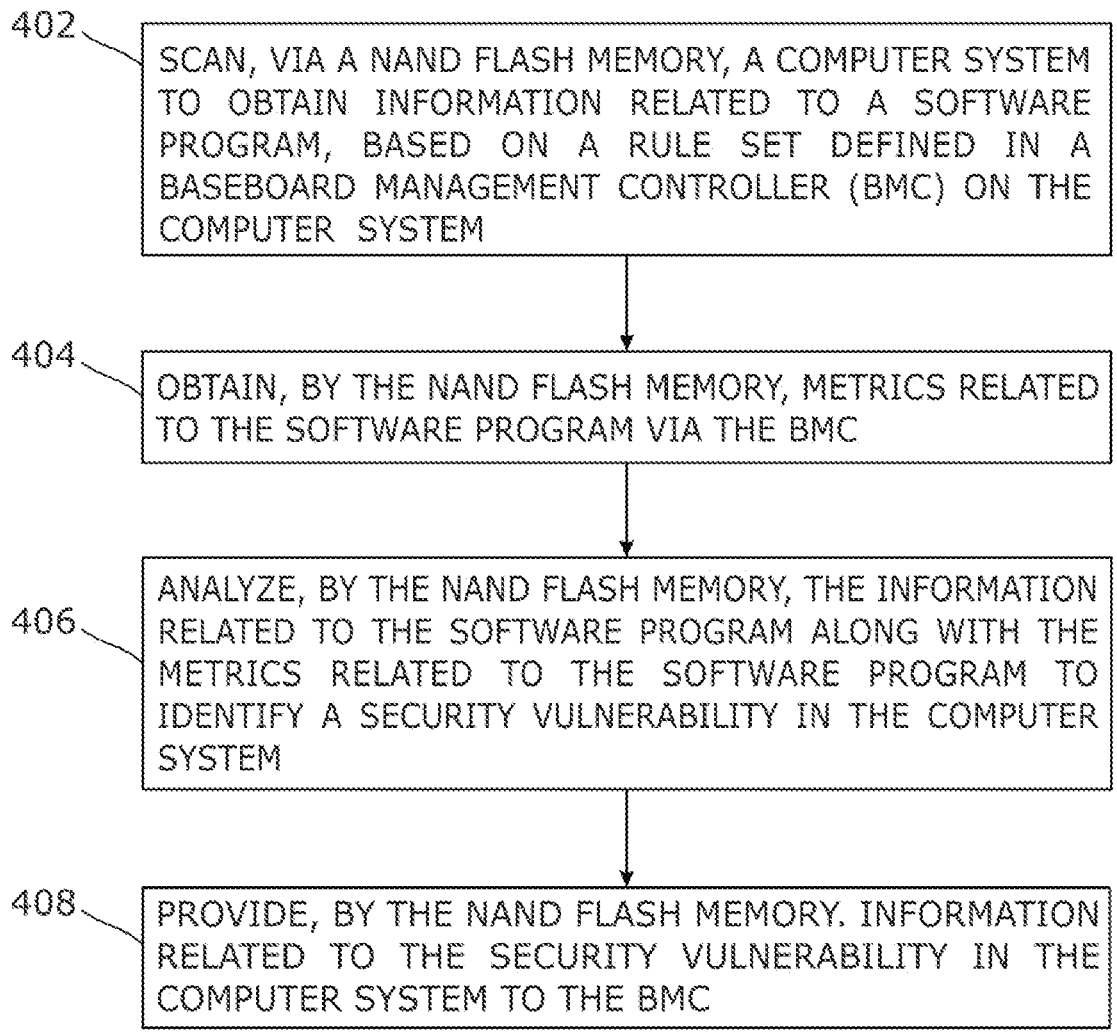
FIG. 4 is a block diagram of an example method of identifying a security vulnerability in a computer system.

FIG. 4 is a block diagram of an example method 400 of identifying a security vulnerability. The method 400, which is described below, may be executed on a computer system 100 of FIG. 1 or system 300 of FIG. 3. However, other devices may be used as well.

At block 402, using a NAND flash memory, a computer system may be scanned to obtain information related to a software program, based on a rule set defined in a management controller (e.g., baseboard management controller (BMC)) on the computer system. At block 404, the NAND flash memory may obtain metrics related to the software program via the BMC. At block 406, the NAND flash memory may analyze the information related to the software program along with the metrics related to the software program to identify a security vulnerability in the computer system. At block 408, the NAND flash memory may provide the information related to the security vulnerability in the computer system to the BMC.

Figure 5:
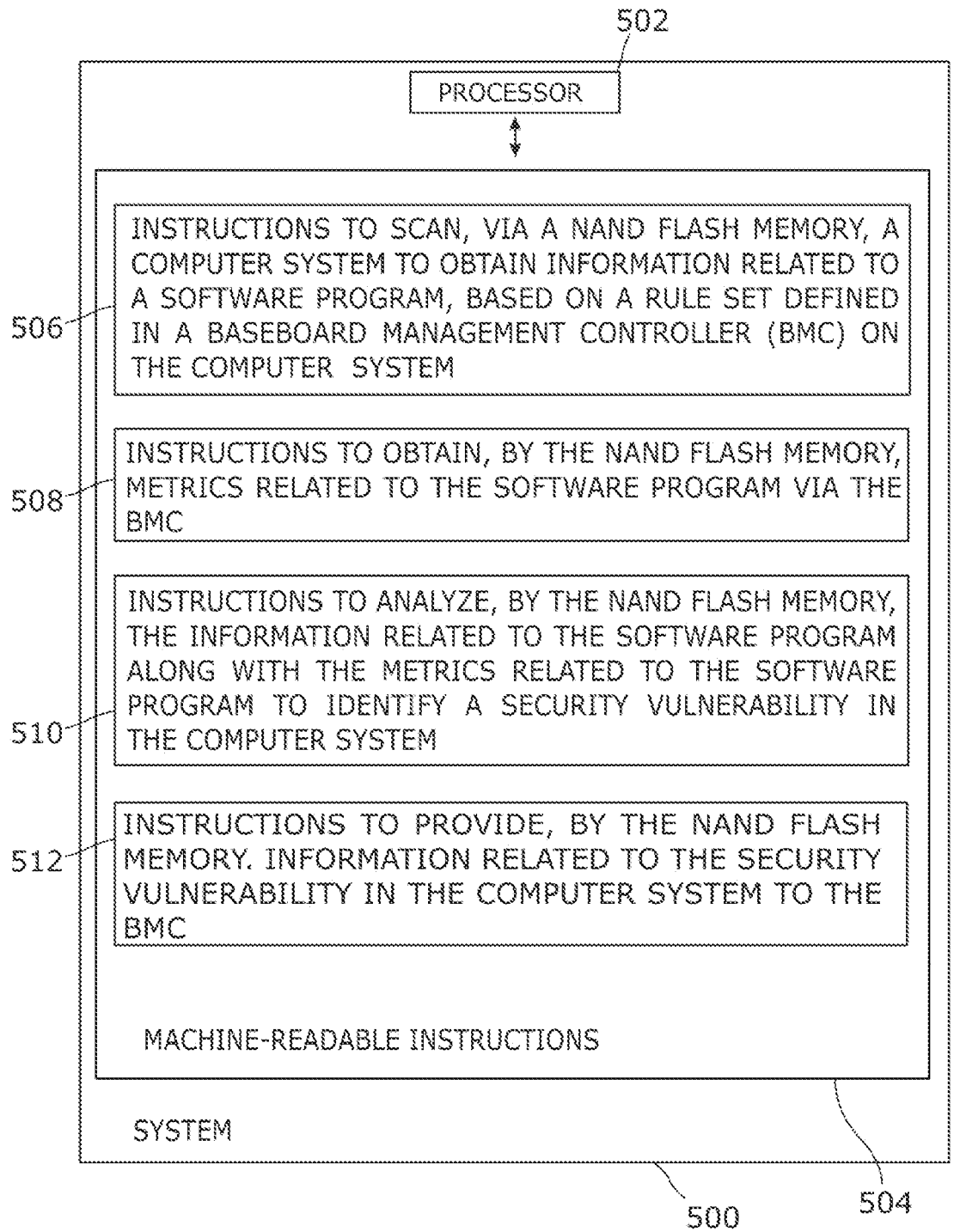
FIG. 5 is a block diagram of an example system including instructions in a machine-readable storage medium for identifying a security vulnerability in a computer system.

FIG. 5 is a block diagram of an example system 500 including instructions in a machine-readable storage medium for identifying a security vulnerability.

System 500 includes a processor 502 and a machine-readable storage medium 504 communicatively coupled through a system bus. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 504 may be a non-transitory machine-readable medium. In some examples, machine-readable storage medium 504 may be remote but accessible to system 500.

Machine-readable storage medium 504 may store instructions 506, 508, 510, and 512. In some examples, instructions 506 may be executed by processor 502 to scan, via a NAND flash memory, a computer system to obtain information related to a software program, based on a rule set defined in a baseboard management controller (BMC) on the computer system. Instructions 508 may be executed by processor 502 to obtain, by the NAND flash memory, metrics related to the software program via the BMC. Instructions 510 may be executed by processor 502 to analyze, by the NAND flash memory, the information related to the software program along with the metrics related to the software program to identify a security vulnerability in the computer system. Instructions 512 may be executed by processor 502 to provide, by the NAND flash memory, information related to the security vulnerability in the computer system to the BMC.

For the purpose of simplicity of explanation, the example method of FIG. 4 is shown as executing serially, however it is to be understood and appreciated that the present and other examples are not limited by the illustrated order. The example systems of FIGS. 1, 3, and 5, and method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
establishing, by a NAND flash memory in a computer system, a communication channel between the NAND flash memory and a software program through a baseboard management controller (BMC), the NAND flash memory being separate from the BMC, and the software program executed on a central processing unit (CPU) separate from the NAND flash memory;

retrieving, by the NAND flash memory, a rule set in the BMC, wherein the rule set includes a parameter to be determined for the software program;

obtaining information related to the software program based on scanning, by the NAND flash memory, the software program over the communication channel through the BMC between the NAND flash memory and the software program, the scanning based on the rule set retrieved by the NAND flash memory from the BMC, wherein the information related to the software program comprises the parameter, and the parameter comprises one or more of a version of the software program on the computer system, a patch applied to the software program, a port related to the software program, a protocol related to the software program, or a service related to the software program;

obtaining, by the NAND flash memory, metrics related to the software program via the BMC;

analyzing, by the NAND flash memory, the information comprising the parameter along with the metrics related to the software program to identify a security vulnerability that is an exploit in the computer system that may be used to perform an unauthorized action within the computer system; and providing, by the NAND flash memory, information related to the security vulnerability in the computer system to the BMC.

2. The method of claim 1, wherein the software program comprises an operating system or application software, and wherein the NAND flash memory analyzes the information and the metrics related to the operating system or the application software.

3. The method of claim 1, wherein the establishing, the retrieving, the scanning, the obtaining of the metrics, and the analyzing are performed by machine-readable instructions executed by a processing resource of the NAND flash memory.

4. The method of claim 1, wherein the information related to the software program obtained by the NAND flash memory based on the scanning comprises information that a patch for the software program is missing.

5. The method of claim 1, wherein the software program comprises an operating system, and wherein the scanning comprises:

logging, by the NAND flash memory, into the operating system; and scanning, by the NAND flash memory, the operating system to obtain the information related to the operating system.

6. The method of claim 1, wherein the BMC comprises a virtual switch that can transition between being enabled and disabled, the parameter represents the port related to the software program, and wherein the scanning comprises scanning, by the NAND flash memory, the port responsive to the virtual switch being enabled.

7. The method of claim 6, wherein the scanning of the port is prevented if the virtual switch is disabled.

8. A NAND flash memory, comprising:

a processor; and a non-transitory storage medium comprising flash memory cells storing instructions executable on the processor in the NAND flash memory to:

establish a communication channel between the NAND flash memory and a software program through a baseboard management controller (BMC) in a computer system, the NAND flash memory being separate from the BMC, and the software program executed on a central processing unit (CPU) separate from the NAND flash memory;

retrieve, at the NAND flash memory, a rule set in the BMC, wherein the rule set includes a parameter to be determined for the software program;

obtain information related to the software program based on scanning, by the NAND flash memory, the software program over the communication channel through the BMC between the NAND flash memory and the software program, the scanning based on the rule set retrieved by the NAND flash memory from the BMC, wherein the information related to the software program comprises the parameter, and the parameter comprises one or more of a version of the software program on the computer system, a patch applied to the software program, a port related to the software program, a protocol related to the software program, or a service related to the software program;

obtain, at the NAND flash memory, metrics related to the software program via the BMC;

analyze, at the NAND flash memory, the information comprising the parameter along with the metrics related to the software program to identify a security vulnerability that is an exploit in the computer system that may be used to perform an unauthorized action within the computer system; and provide, from the NAND flash memory, information related to the security vulnerability to the BMC.

9. The NAND flash memory of claim 8, wherein the information related to the software program obtained by the NAND flash memory based on the scanning comprises information that an unsecured protocol is employed by the software program.

10. The NAND flash memory of claim 8, wherein the BMC comprises a virtual switch that can transition between being enabled and disabled, the parameter represents the port related to the software program, and wherein the scanning comprises scanning, by the NAND flash memory, the port responsive to the virtual switch being enabled.

11. A non-transitory machine-readable storage medium comprising instructions that upon execution by a NAND flash memory cause the NAND flash memory to:

establish a communication channel between the NAND flash memory and a software program through a baseboard management controller (BMC) in a computer system, the NAND flash memory being separate from the BMC, and the software program executed on a central processing unit (CPU) separate from the NAND flash memory;

retrieve, at the NAND flash memory, a rule set in the BMC, wherein the rule set includes a parameter to be determined for the software program;

obtain information related to the software program based on scanning, by the NAND flash memory, the software program over the communication channel through the BMC between the NAND flash memory and the software program, the scanning based on the rule set retrieved by the NAND flash memory from the BMC, wherein the information related to the software program comprises the parameter, and the parameter comprises one or more of a version of the software program on the computer system, a patch applied to the software program, a port related to the software program, a protocol related to the software program, or a service related to the software program;

obtain, at the NAND flash memory, metrics related to the software program via the BMC;

analyze, at the NAND flash memory, the information comprising the parameter along with the metrics related to the software program to identify a security vulnerability that is an exploit in the computer system that may be used to perform an unauthorized action within the computer system; and provide, by the NAND flash memory, information related to the security vulnerability to the BMC.

12. The non-transitory machine-readable storage medium of claim 11, wherein the parameter represents the port related to the software program, the information related to the software program obtained based on the scanning by the NAND flash memory comprises information of the port, and the analyzing comprises analyzing the information of the port along with the metrics to identify the security vulnerability.

13. The non-transitory machine-readable storage medium of claim 12, wherein the BMC comprises a virtual switch that can transition between being enabled and disabled, and wherein the scanning comprises scanning, by the NAND flash memory, the port responsive to the virtual switch being enabled.

14. The non-transitory machine-readable storage medium of claim 11, wherein the software program includes an operating system.

15. The non-transitory machine-readable storage medium of claim 11, wherein the software program includes a computer application.

16. The non-transitory machine-readable storage medium of claim 11, wherein the metrics related to the software program comprises one or more of CPU usage, memory usage, or input/output usage.

17. The non-transitory machine-readable storage medium of claim 11, wherein the parameter represents the protocol related to the software program, the information related to the software program obtained based on the scanning by the NAND flash memory comprises information of the protocol, and the analyzing comprises analyzing the information of the protocol along with the metrics to identify the security vulnerability.

* * * * *